United States Patent [19]

Schwarzmann et al.

[11] 4,455,122
[45] Jun. 19, 1984

[54] BLADE TO BLADE VIBRATION DAMPER

[75] Inventors: Russell A. Schwarzmann, Marlborough; Herbert J. Lillibridge, Plainville, both of Conn.

[73] Assignee: United Technologies Corporation, Hartford, Conn.

[21] Appl. No.: 330,423

[22] Filed: Dec. 14, 1981

[51] Int. Cl.³ .............................................. F01D 5/10
[52] U.S. Cl. .............................. 416/190; 416/193 A; 416/500
[58] Field of Search ............... 416/145, 190, 193 A, 416/500

[56] References Cited

U.S. PATENT DOCUMENTS 2,948,505  8/1960  Sonder .......................... 416/500 X
3,752,599  8/1973  Pace .............................. 416/500 X

FOREIGN PATENT DOCUMENTS 670665  4/1952  United Kingdom ................. 416/500

Primary Examiner—Harvey C. Hornsby
Assistant Examiner—Arthur D. Dahlberg
Attorney, Agent, or Firm—Robert C. Walker

[57] ABSTRACT

Apparatus for dampening rotor blade vibratory energy in a rotary machine is disclosed. Concepts employing blade to blade damping are discussed.

In one detailed form, a damper (52) is disposed to seat against the undersides of adjacent blade platform sections (20) and a seal (42) is spaced sufficiently close to the damper so as to be deflected against the damper under centrifugal loads to augment dampening of the rotor blades by the damper.

2 Claims, 3 Drawing Figures

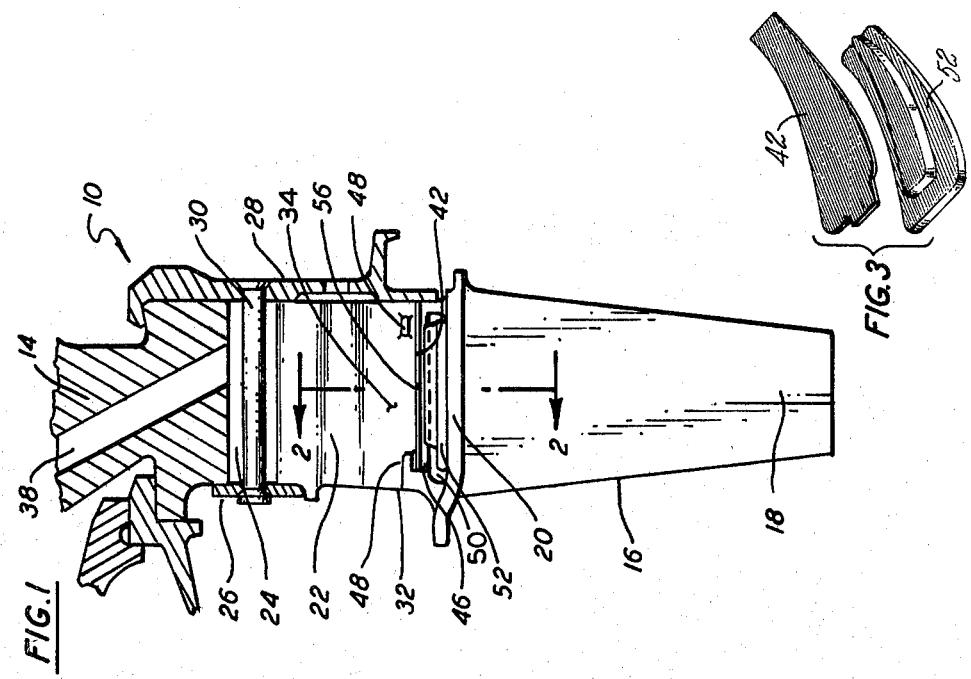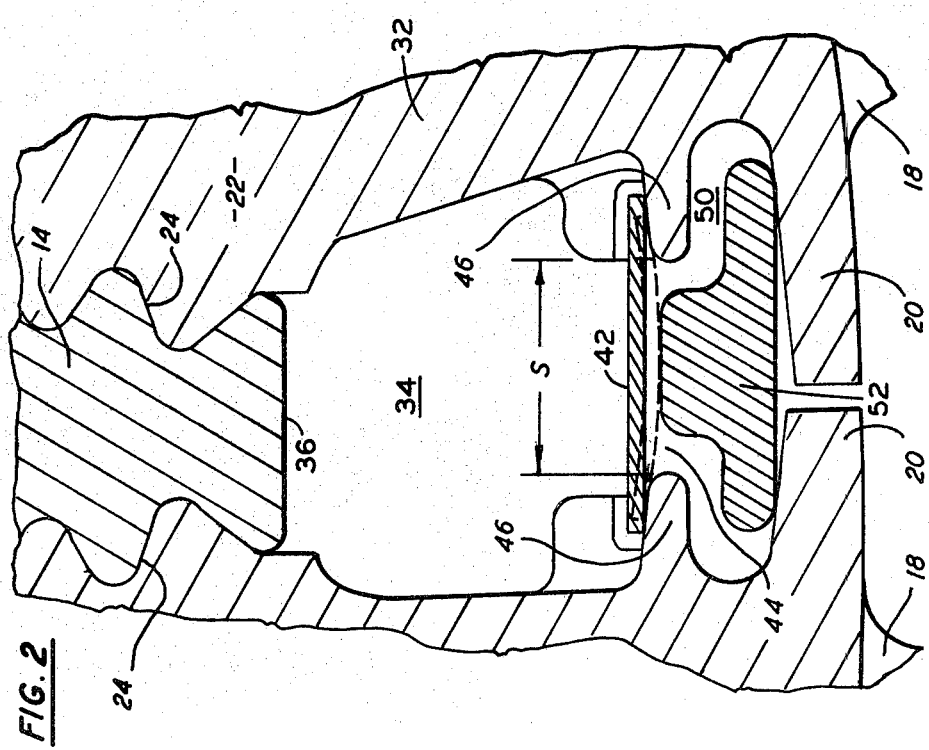

BLADE TO BLADE VIBRATION DAMPER

DESCRIPTION

1. Technical Field

This invention relates to axial flow rotary machines and specifically to the damping of vibratory energy in the blades of such machines.

The concepts were developed in the gas turbine engine industry for use in the turbine section of gas turbine engines, but have wider applicability in other industrial applications as well.

2. Background Art

In a typical rotor assembly of an axial flow turbine, a plurality of rotor blades extend outwardly from a disk, or drum shaped structure. The blades extend across an annular flowpath for working medium, and in turbine embodiments extract energy from the working medium gases flowing across the blades. Each of the blades is formed of an airfoil section extending into the flowpath, a root section interlockingly engaging the disk or drum, and a platform section defining the inner boundary of the working medium flow-path.

The sequence of rotor blades passing through local aerodynamic perturbations in the working medium flowpath initiate alternatingly increased and decreased loadings on the blades. This variation in loading characteristic induces blade deflection and imparts a stress on the blade material. If the frequency at which the loading characteristic varies is coincident with the natural frequency of the blade resonance occurs; the deflection amplitudes become reinforcing and vibratory damage likely results.

Vibratory phenomenon and the need to attend to such problems in rotary machines has long been recognized. U.S. Pat. Nos. 3,112,915 to Morris entitled "Rotor Assembly Air Baffle"; 3,266,770 to Harlow entitled "Turbomachine Rotor Assembly"; 3,610,778 to Schottikon entitled "Support for Rotor Blades in a Rotor"; 3,666,376 to Damlis entitled "Turbine Blade Damper"; 3,709,631 to Karstensen et al entitled "Turbine Blade Seal Arrangement"; 3,751,183 to Nichols et al entitled "Interblade Baffle and Damper"; 3,887,298 to Hess et al entitled "Apparatus for Sealing Turbine Blade Damper Cavities"; 4,101,245 to Hess et al entitled "Interblade Damper and Seal for Turbomachinery Rotor"; 4,182,598 to Nelson entitled "Turbine Blade Damper"; and British Pat. No. 1,259,750 entitled "Rotor for a Fluid Flow Machine" are representative of past solutions to rotor blade vibration problems.

As will become apparent in the specification which follows, the concepts of the present invention depart both structurally and functionally from those previously utilized in the industry.

DISCLOSURE OF INVENTION

According to the present invention, a platform seal between adjacent rotor blades of a gas turbine engine deflects under operative loads to bear against a blade to blade vibration damper disposed outwardly thereof.

A primary feature of the present invention is the operative relationship of the vibration damper disposed beneath the platform of a pair of adjacent blades and the flexible platform seal disposed inwardly of the damper. In the installed condition, each damper is trapped beneath the platforms of adjacent blades within a cavity defined at its radially inward end by the flexible seal. In the operative condition the damper is urged outwardly by centrifugal forces against the undersides of the platforms of the adjacent blades; the flexible seal deflects against the inwardly facing side of the damper.

Principal advantages of the present invention are effective sealing capability and good vibration absorption capacity. Economy and ease of manufacturability of the seal and damper elements are additional advantages. Effective sealing results as the seal flexes in response to centrifugal loads conforming the seal to the geometry of the blade platforms. The vibration absorption capacity of the damper is enhanced as the midportion of the seal bears against the damper under such loads. Blade energy is accordingly dissipated at relative movement between the blades and the damper and at relative movement between the seal and damper at the region of bearing contact.

The foregoing, and other features and advantages of the present invention, will become more apparent from the following description and accompanying drawing.

BRIEF DESCRIPTION OF THE DRAWING

FIG. 1 is a cross section view taken through a turbine rotor assembly of a gas turbine engine;

FIG. 2 is a sectional view taken along the line 2—2 as shown in FIG. 1; and

FIG. 3 is an exploded perspective view illustrating the damper and seal.

BEST MODE FOR CARRYING OUT THE INVENTION

The best mode for carrying out the invention is described with respect to a gas turbine engine embodiment thereof. A cross section view taken through the disk and blade assembly 10 of such an engine is shown in FIG. 1. The disk and blade assembly principally comprises a rotor disk 14 and a plurality of rotor blades, as represented by the single blade 16, extending outwardly therefrom.

Each rotor blade 16 has an airfoil section 18, a platform section 20, and a root section 22. The airfoil sections extend radially on the assembly into an axially directed flowpath for working medium gases. Each platform section forms a portion of the inner wall of the flowpath for working medium gases. Each root section engages a correspondingly shaped slot 24 at the periphery of the disk, radially retaining the blade on the assembly 10. A front sideplate 26 and a rear sideplate 28 axially retain the blade on the rotor assembly and are secured to the disk by means, such as the rivet 30. The blade root section has an extended neck portion 32 raising the blade above the disk to the flowpath for working medium gases. The platform section defines a portion of the inner wall of the flowpath for working medium gases. A cavity 34 is formed above the rim 36 of the disk between the extended neck regions of adjacent blades.

The rotor blades are typically cooled and have a hollow portion extending internally of the blade from the root section and into the airfoil section for flowing cooling air through the blade. Cooling air is supplied to the root section via a conduit or hole 38 in the disk. A portion of the cooling air leaks both radially and axially across the interface between the blade root section and the corresponding disk slot and into the cavity 34. A plate-like seal 42, fabricated of flexible sheet metal is disposed across the gap 44 between adjacent rotor blades for sealing between adjacent rotor blades, and rests upon the axially extending protrusions 46. The protrusions 46 are more clearly shown in FIG. 2. The function of the plate 42 is to seal the outward end of the cavity 34. One or more tabs 48 extend from the blade and over the plate 42 to radially trap the plate in proximity to the protrusions 46.

The protrusions 46 extending from the blades define a second cavity 50 outwardly of the plate 42 and beneath the platform sections 20 of the blades. A vibration damper 52 extends across the cavity 50 and is capable of simultaneously resting against the undersides of the platforms of the two adjacent blades.

During operation of the engine in which the damper 52 and the plate 42 are installed centrifugal forces urge both the damper and the plate outwardly on the rotor assembly 10. The damper comes to bear against the undersides of the blade platform sections 20 and the plate 42 comes to bear against the protrusions 46. The center portion 56 of the plate 42 flexes against the restrained damper. A plate having a nominal thickness of thirty thousandths of an inch (0.030 in.) with an unsupported span S on the order of three hundred to four hundred thousandths of an inch (0.300 in.-0.400 in.) has sufficient flexibility. Deflection on the order of twenty to thirty thousandths of an inch (0.020 in.-0.30 in.) is expected. The spacing between the seal and the damper is accordingly less than the expected deflection such that the seal is capable of bearing against the damper.

Rotor blade vibration manifests itself in the platform region as circumferential movement of the platforms. The energy causing such movement is dissipated by frictional contact of the damper with the two platforms and, collaterally, by frictional contact of the damper with the deflected plate 42. The deflected seal bearing against the damper augments the energy dissipation capacity of the damper. The deflected position of the plate in the operative mode is illustrated by the dotted line in FIG. 2.

The damper 52 is capable of being fabricated by casting techniques free of finish machining. Similarly, the plate 42 is susceptible of simple manufacture, relying upon deflection to effect conformity with the protrusions 46 to effect sealing of the space between adjacent blades.

Although this invention has been shown and described with respect to detailed embodiments thereof, it will be understood by those skilled in the art that various changes in form and detail thereof may be made without departing from the spirit and scope of the claimed invention.

We claim:

1. Apparatus for dampening rotor blade vibratory energy which is characterized by a damper disposed beneath the platforms of two adjacent rotor blades and a plate-like seal inwardly of the damper which is radially restrained by the adjacent rotor blades, wherein the spacing of said seal from the damper is sufficiently close such that under centrifugal loading the midportion of the seal deflects to bear against the damper, thereby augmenting the energy dissipation capacity of the damper.

2. A blade and disk assembly of a rotary machine having a flowpath for working medium gases extending axially therethrough, which comprises:
    a rotor disk having a plurality of slots disposed about the periphery thereof;
    a plurality of rotor blades, each having a root section engaging a corresponding slot of the rotor disk, a platform section defining a portion of the inner wall of the flowpath for working medium gases and an airfoil section extending into the flowpath;
    a vibration damper disposed beneath the platform section of two adjacent rotor blades and adapted to bear against the undersides of said platform sections in response to centrifugal loads for dampening of rotor blade vibrations; and
    a flexible seal disposed against said two adjacent rotor blades for the prevention of leakage radially therebetween, wherein said seal is spaced sufficiently close to said damper so as to be capable of deflecting against the damper in response to centrifugal loads to further dampen rotor blade vibration.

* * * * *